(12) United States Patent
Seo

(10) Patent No.: US 9,781,504 B2
(45) Date of Patent: Oct. 3, 2017

(54) VOICE SIGNAL RETURN TYPE EARPHONE FOR SMART DEVICE

(71) Applicant: RSUPPORT CO., LTD., Seoul (KR)

(72) Inventor: Hyungsu Seo, Gyeonggi-do (KR)

(73) Assignee: RSUPPORT CO., LTD., Seoul (KR)

( * ) Notice: Subject to any disclaimer, the term of this patent is extended or adjusted under 35 U.S.C. 154(b) by 0 days.

(21) Appl. No.: 15/190,713

(22) Filed: Jun. 23, 2016

(65) Prior Publication Data
US 2017/0188130 A1 Jun. 29, 2017

(30) Foreign Application Priority Data
Dec. 23, 2015 (KR) .......................... 10-2015-0184939

(51) Int. Cl.
*H04R 1/10* (2006.01)
*G10L 15/22* (2006.01)
*H04R 1/08* (2006.01)
*H04R 3/00* (2006.01)

(52) U.S. Cl.
CPC ............ *H04R 1/1041* (2013.01); *G10L 15/22* (2013.01); *H04R 1/08* (2013.01); *H04R 1/1016* (2013.01); *H04R 1/1033* (2013.01); *H04R 3/00* (2013.01); *H04R 2499/11* (2013.01)

(58) Field of Classification Search
CPC ...... H04R 1/1041; H04R 1/08; H04R 1/1016; H04R 1/1033; H04R 3/00; H04R 2499/11; G10L 15/22
See application file for complete search history.

(56) References Cited

U.S. PATENT DOCUMENTS

| 2005/0130711 A1* | 6/2005 | Kang | .................... H04M 9/082 455/570 |
| 2012/0321097 A1* | 12/2012 | Braho | ...................... H04R 1/10 381/74 |

FOREIGN PATENT DOCUMENTS

| KR | 10-2002-0082967 A | 11/2002 |
| KR | 10-2005-0095187 A | 9/2005 |
| KR | 10-2010-0126919 A | 12/2010 |
| KR | 10-2014-0097085 A | 8/2014 |

* cited by examiner

*Primary Examiner* — Brenda Bernardi
(74) *Attorney, Agent, or Firm* — Mintz Levin Cohn Ferris Glovsky and Popeo, P.C.; Kongsik Kim; Colleen H. Witherell

(57) ABSTRACT

An earphone connected to a smart device is provided. The earphone connected to a smart device includes a voice signal input and output function that returns a sound generated by the smart device itself as well as a sound generated from the exterior into the smart device as a high-quality sound. The voice signal is extracted from a wire that connects the smart device and the ear receiver and inputs the extracted voice signal into the input terminal of the microphone of the smart device.

5 Claims, 5 Drawing Sheets

FIG. 4A          FIG. 4B
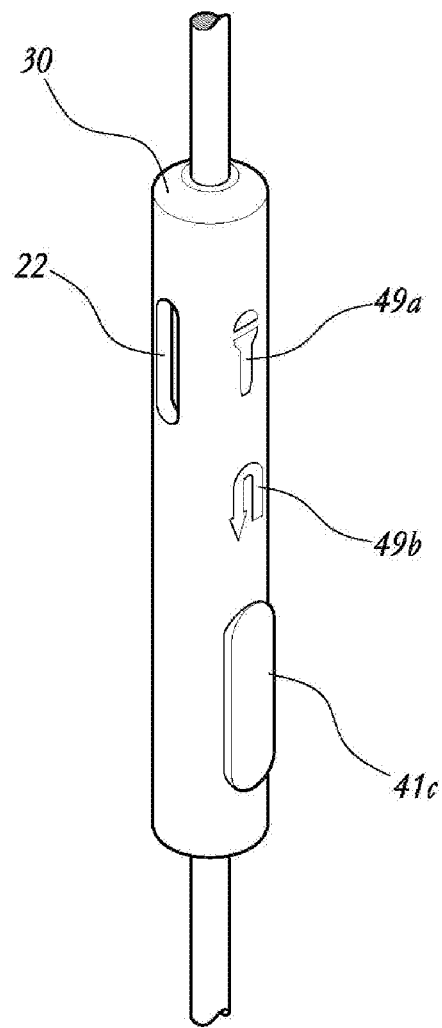
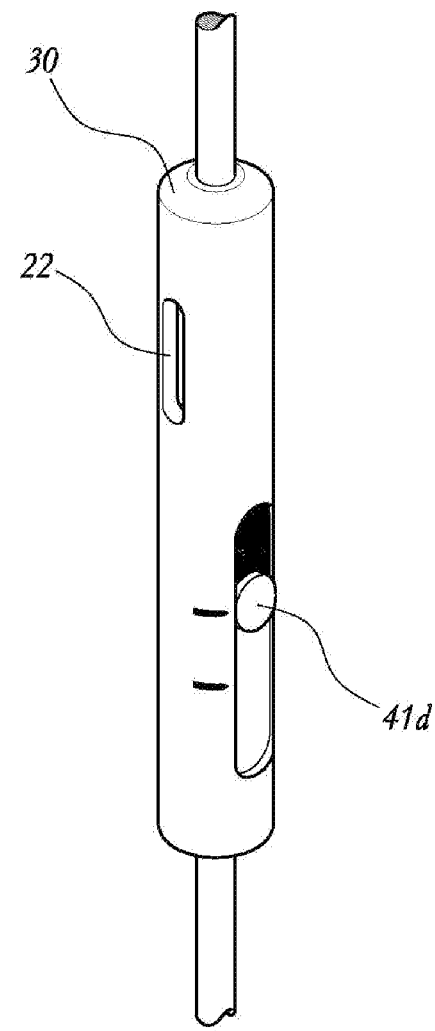

VOICE SIGNAL RETURN TYPE EARPHONE FOR SMART DEVICE

CROSS-REFERENCE TO RELATED APPLICATION

This application claims priority to Korean Application No. 10-2015-0184939 filed on Dec. 23, 2015, which is incorporated herein by reference.

TECHNICAL FIELD

The present invention relates to an earphone connected to a smart device and more particularly to a smart phone, a tablet computer that has a voice signal input and output function mounted thereon, that returns a sound generated by the smart device and the exterior into the smart device 1

RELATED ART

Generally, a smart device 10 such as a smart phone, a tablet computer or the like that utilize a multi-function information device include a high performance processing unit, a large capacity memory unit and a high resolution touch screen to perform a variety of application programs, rather than being used as a simple communication device. In other words, the smart device 10 overcomes the temporal and spatial constraints in using an information device by minimizing power consumption and maximizing portability through miniaturization and reduction of weight. In particular, the miniaturization and reduction of weight are accomplished by applying an integrated input and output device having combined input and output functions. For example, a touch screen of the smart devices 10 and integration of the processing unit and the memory unit are typically embedded in the smart device 10.

Currently, smart devices 10 have performance comparable to those of general desktop computers in processing speed. Since an application program performing various functions such a game, a multimedia information processing function and the like is executed according thereto, a function of inputting and outputting a high-quality voice signal is also included. Although input and output of a voice signal of the smart device 10 can be performed through a built-in speaker and a built-in microphone, a voice input and output device can be omitted. Alternatively, the output power can be insufficient based on the miniaturization and weight reduction of the smart device 10 described above. Accordingly, a detachable device such as earphone mounting a microphone 22 as shown in FIG. 1 is utilized.

In a conventional earphone, the ear receiver 21 may be configured to receive a voice signal output from the smart device 10 and input a voice signal generated by the microphone 22. Further the ear receiver 21 and the microphone 22 may be integrated in the form of an earphone, the ear receiver 21 and the microphone 22 respectively, may include independent structure in an electrical behavior. Accordingly, in a conventional earphone mounting a microphone 22 as shown in FIG. 1, the ear receiver 21 only performs a function of simply outputting a voice signal transmitted from the smart device 10, and the microphone 22 merely performs a function of simply inputting a sound generated from the outside, such as a voice of a user or the like, and thus any type of interaction cannot be expected at all between the voice output signal and the input signal of the smart device 10.

Individual processing of the output voice signal and the input voice signal necessarily invites limitation in utilizing the smart device 10. For example, there must be a constraint in the process of minimizing loss and distortion of a sound output from the smart device 10 and recording the sound or adding the sound to a recorded video. In other words, when a situation of recording a sound generated by the smart device 10 into the same smart device 10 is assumed, since a sound output from a built-in speaker or the ear receiver 21 and propagated in the air is recorded in a method of inputting the sound into a built-in microphone or the microphone 22 mounting an earphone, the volume and quality are degraded.

Particularly, degradation occurs when a user executes a moving image capture application program while playing a game using the smart device 10 and records a game screen together with a sound output while playing the game or plays back a music file recorded in the smart device 10 while photographing a moving image using the smart device 10 and inserts the music as background music. Accordingly, the above mentioned function cannot be sufficiently utilized with the superior voice input and out and voice processing performance of the smart device 10 itself and a completed record of voice and video does not meet the expectation of the user.

The above information disclosed in this section is merely for enhancement of understanding of the background of the invention and therefore it may contain information that does not form the prior art that is already known in this country to a person of ordinary skill in the art.

SUMMARY

The present invention provides an earphone for a smart device 10 with structure of a jack 23 disposed at an end of a wire coupled to an ear receive 21 and a microphone 22 combined with the smart device 10.

In one aspect of the present invention, a voice signal return type earphone for a smart device, may be include an output terminal 11 configured to output a voice signal and an input terminal 12 having an ear receiver 21 and a microphone 22 configured to input a voice signal, a handling unit 30 disposed on a wire that connects the output terminal 11 and the input terminal 12 of the smart device 10 to the ear receiver 21 and the microphone 22, and a wire that connects the output terminal 11 of the smart device 10 to the ear receiver 21 and a wire connecting the input terminal 12 of the smart device 10 to the microphone 22 are connected to each other within the handling unit 30 through a connection unit 31, and a switching unit 40 is connected to the wire connecting the input terminal 12 of the smart device 10 to the microphone 22 and the connection unit 31 and the wire that connects the input terminal 12 of the smart device 10 to the microphone 22 and the connection unit 31 are configured to be connected or disconnected by the switching unit 40. The voice signal output from the output terminal 11 may be extracted through the connection unit 31 and may be transmitted into the wire that connects the microphone 22 and the input terminal 12 to be input into the input terminal 12. Additionally, an extracted signal control unit 35 may be installed in the connection unit 31 and may be configured to transform the extracted voice signal.

The present invention provides for simultaneous connections of more than 500,000 global users within cloud grid system for the purpose of providing internet of things (IoT) platform service for web connectivity device.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein:

FIGS. 4A and 4B are exemplary a perspective view showing a selected portion of a handling unit according to an exemplary embodiment of the present invention.

DETAILED DESCRIPTION

The detailed configuration and operating principles of the present invention will be described below with reference to the accompanying drawings. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Although an exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
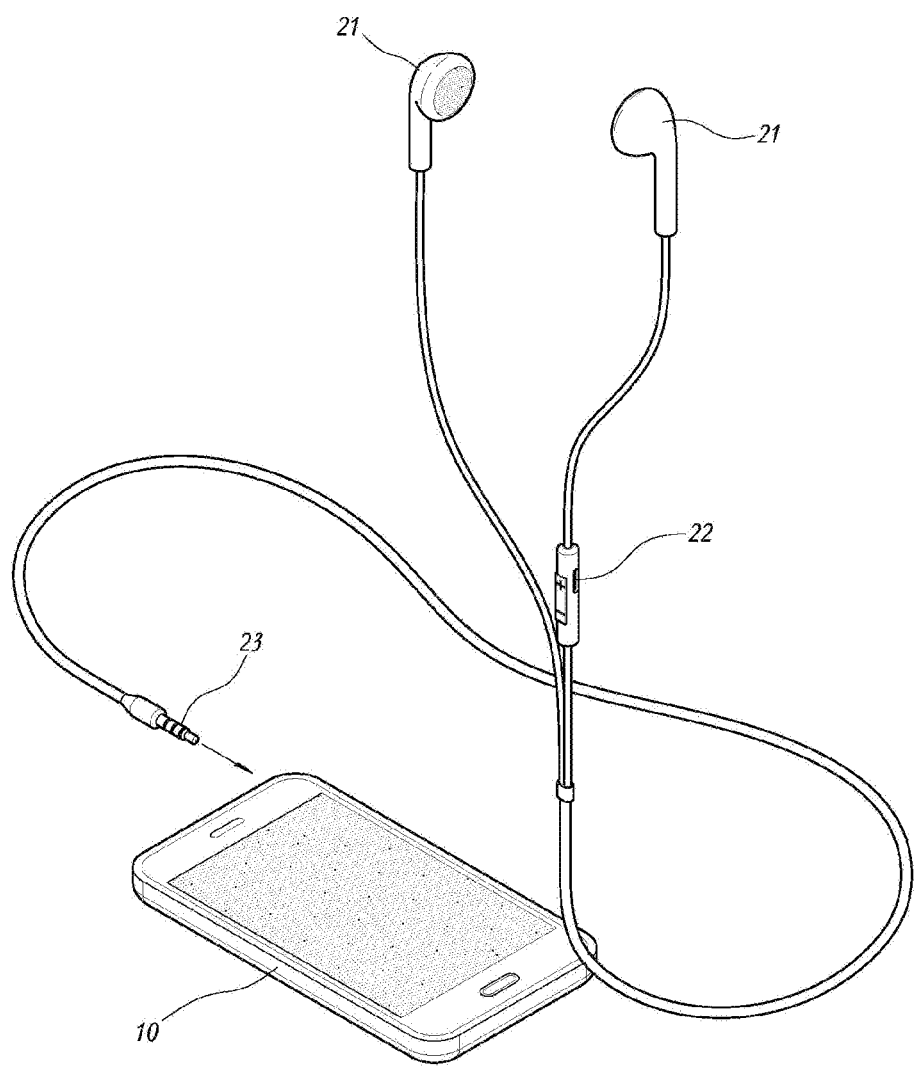
FIG. 1 is an exemplary perspective view showing a conventional earphone for a smart phone.
Figure 2:
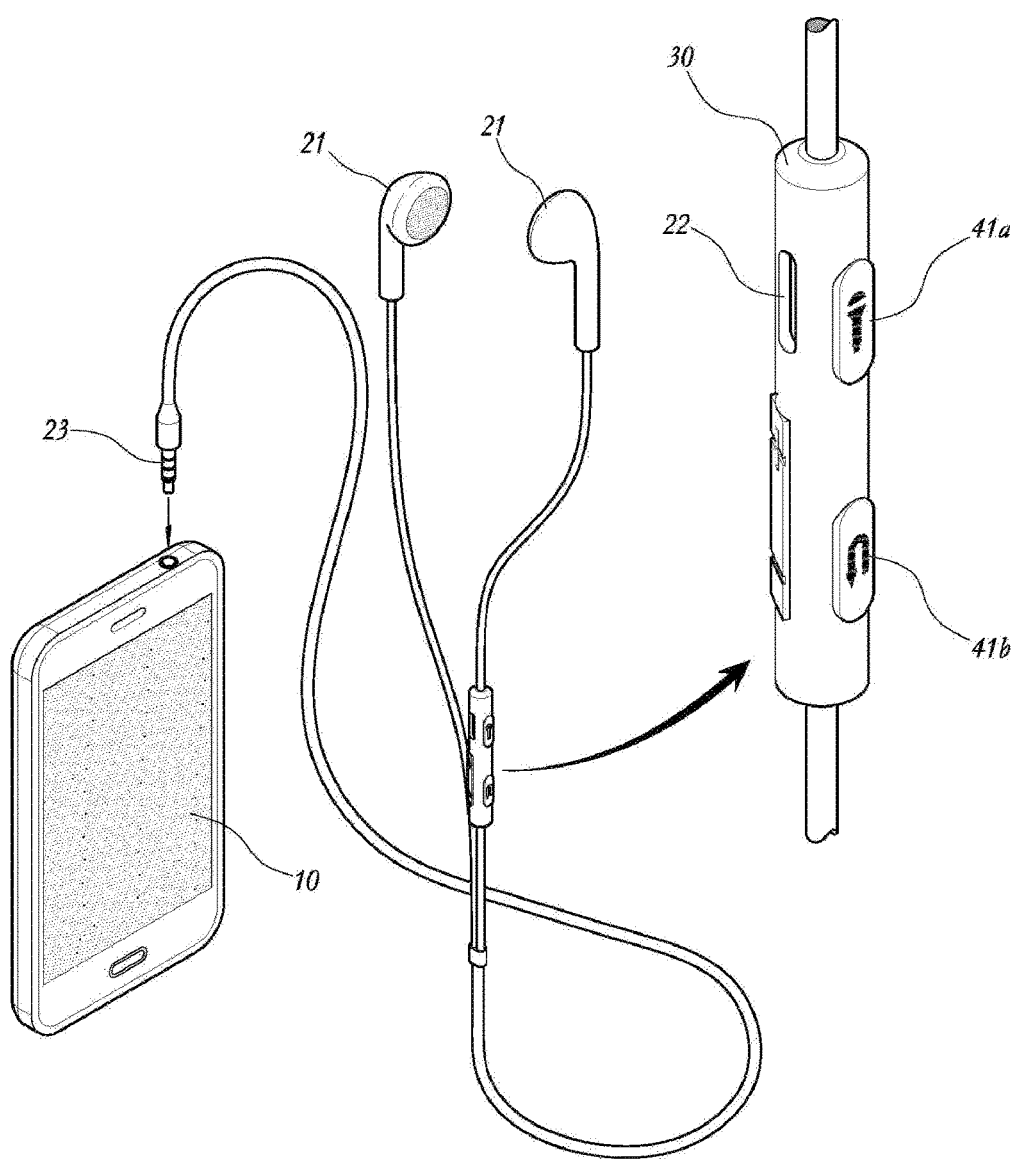
FIG. 2 shows an exemplary perspective view according to an exemplary embodiment of the present invention.

As shown, FIG. 2 illustrates an exemplary view of the appearance and a use state of an earphone. The earphone may include an ear receiver 21, a handling unit 30 having a microphone 22 and a switch 41 mounted thereon, and a jack 23. The jack 23 may be combined with a smart device 10 (e.g., a smart phone or the like), and a sound output from the smart device 10 may be configured to be output through the ear receiver 21, and a voice input into the microphone 22 may be configured to be input into the smart device 10.

Figure 3:
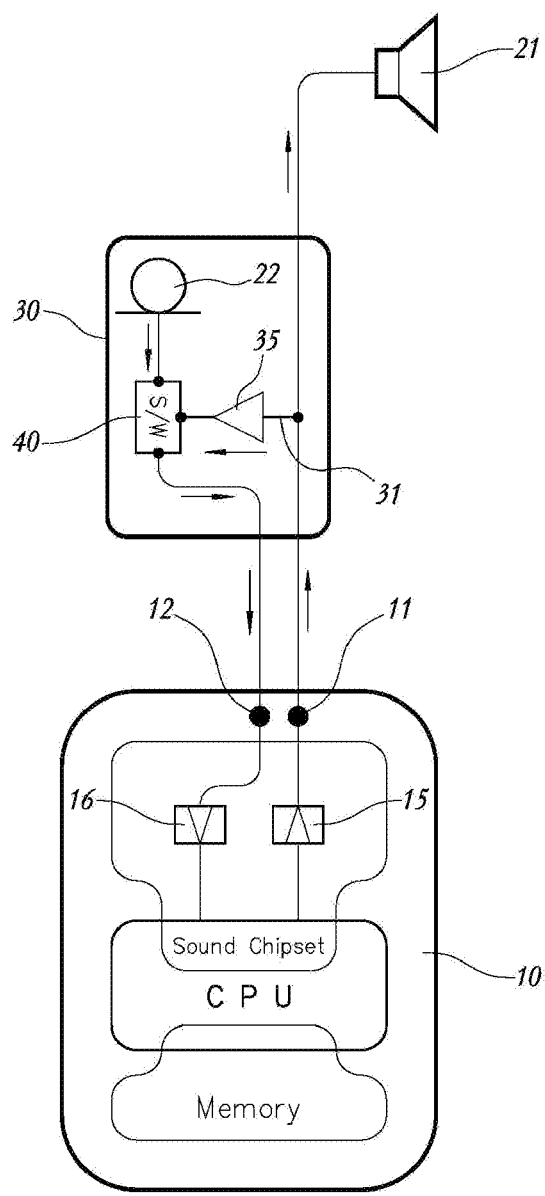
FIG. 3 shows an exemplary configuration view according to an exemplary embodiment of the present invention.

FIG. 3 is an exemplary view showing the structure and an electrical connection of the present invention. As shown in the figure, the present invention relates to an earphone for a smart device 10, coupled to the smart device 10 that may include an output terminal 11 configured to output a voice signal and an input terminal 12 configured to input a voice signal. The earphone for a smart device may include an ear receiver 21 and a microphone 22. Further, a handling unit 30 may be disposed on a wire that connects the output terminal 11 and the input terminal 12 of the smart device 10 to the ear receiver 21 and the microphone 22. Additionally, a wire that couples the output terminal 11 of the smart device 10 to the ear receiver 21 and a wire that couples the input terminal 12 of the smart device 10 to the microphone 22 may be connected to each other within the handling unit 30 through a connection unit 31. A switching unit 40 connected to the wire may connect the input terminal 12 of the smart device 10 to the microphone 22 and the connection unit 31. The wire that connects input terminal 12 of the smart device 10 may be connected to the microphone 22 and the connection unit 31 and may be configured to be connected or disconnected by the switching unit 40.

In the exemplary embodiment shown in FIG. 3, the switching unit 40 may include a connection point of the wire to couple the input terminal 12 of the smart device 10 to the microphone 22 and the connection unit 31. In particular, the wire may connect the input terminal 12 to the microphone 22 to the connection unit 31 through the switching unit 40. For example, the switching unit 40 may be configured to connect or disconnect disconnecting a plurality of wires or circuits disposed therebetween. The switching unit may be a variety of components for example, a selection circuit, a switching element or a group of switching elements, a chipset and the like.

The switching unit 40 disposed within the handling unit 30 coupled to the switch 41 may be exposed to the exterior of the handling unit 30 as shown in the selectively exploded portion of FIG. 2. The switching unit 40 may be configured to connect and disconnect the wire that connects the input terminal 12 and the microphone 22 when a user handles the switch 41, and the switching unit 40 may be configured to connect and disconnect the wire coupled to the connection unit 31.

As described above, the wire that connects the output terminal 11 to the ear receiver 21 and the wire that connects the microphone 22 to the input terminal 12 are connected through the connection unit 31. The voice signal output from the output terminal 11 may be extracted through the connection unit 31 and may be transmitted into the wire that connects the microphone 22 and the input terminal 12 to be input into the input terminal 12. In other words, when the voice signal output is transferred from the output terminal 11 connected to an output signal processing unit 15 of a sound chipset embedded within the smart device 10 to the ear receiver 21 through the wire, the voice signal may be extracted through the connection unit 31 embedded within the handling unit 30. The voice signal may be transmitted into the wire that connects the microphone 22 and the input terminal 12 via the switching unit 40. The extracted voice signal may be transmitted into the wire and may be configured to be input into the input terminal 12 connected to an input signal processing unit 16 of the sound chipset embedded within the smart device 10.

Accordingly, when the voice signal generated by the output signal processing unit 15 of the sound chipset embedded in the smart device 10 is output from a built-in speaker or the ear receiver 21 and input into the microphone 22 through propagation of the voice signal in the air or physical vibration of the smart device 10. The voice signal output from the output terminal 11 may be directly and electrically input into the input terminal 12 of the smart device 10 by way of the connection unit 31 and the switching unit 40. Accordingly, the physical propagation, loss and distortion of the sound may be effectively suppressed.

Additionally, as shown in FIG. 3, an extracted signal control unit 35 may include the connection unit 31 of the handling unit 30 to configured control the voice signal extracted from the wire that connects the output terminal 11. The extracted signal control unit 35 may include a circuit configured to process a voice signal. For example the connection unit 31 may be configured to that performs a function to increase or decrease the voice signal to a desired output level or remove noise during input of the voice signal output from the output terminal 11 into the input terminal 12. Particularly, as shown in FIG. 3, a detailed function of the earphone of the present invention may be configured to be controlled by the selection of the switching unit 40 between the microphone 22 wire that connects the input terminal 12 and the microphone 22 and the wire to the connection unit 31. For example, a connection between the wires may be configured to be controlled by the wire connection state and the sound input state based on the behavior of the switching unit 40 described below.

First, when the switching unit 40 connects both the microphone 22 wire and the connection unit 31 wire, a voice signal output from the output terminal 11 and a voice signal generated by the microphone 22 may be input into the input terminal 12 together. Accordingly, a sound mixing the sound output from the smart device 10 and the sound generated from the exterior (e.g., a voice of a user or the like) may be input into the smart device 10. When the switching unit 40 connects the microphone 22 wire, the voice signal output from the output terminal 11 may be configured to be transmitted to the ear receiver 21, and the voice signal generated by the microphone 22 may be uniquely input into the input terminal 12. When the switching unit 40 is configured to disconnect the microphone 22 wire and configured to connect the wire to the connection unit 31 and the input terminal 12, the voice signal generated by the microphone 22 may be terminated, and the voice signal output from the output terminal 11 may be uniquely input into the input terminal 12. When the switching unit 40 is configured to disconnect both the microphone 22 wire and the connection unit 31 wire, the voice signal output from the output terminal 11 may be transmitted to the ear receiver 21, and any voice signal is not input into the input terminal 12.

The switching unit 40 may be connected to and handled by the switch 41 as shown in the selectively exploded portion of FIG. 2. In the embodiment shown in the figure, the switch 41*a* positioned at an upper portion of the figure may be configured to connect and disconnect the microphone 22 wire. The switch 41*b* positioned at a lower portion of the figure may be configured to connect and disconnect the connection unit 31 wire. The switch 41 of the handling unit 30 may be modified in a variety of forms as shown in FIGS. 4A and 4B. A single switch 41*c* may be applied in the embodiment shown in FIG. 4A, in which the connecting and disconnecting function of the switching unit 40 described above is performed by sensing the number of times or a time period of pressing the corresponding switch 41*c*. For example, in the embodiment, a display unit 49 may include a light emitting element, an LCD or the like in the handling unit 30 to display a connection state of the wires.

In other words, in FIG. 4A, a display unit 49*a* positioned in an upper portion of the figure illustrates a connection state of the microphone 22 wire, and a display unit 49*b* positioned in a lower portion of the figure illustrates a connection state of the connection unit 31 wire. In particular, a user may grasp a connection state of each wire based on the lighting on and off state of the display units 49. In addition, as shown FIG. 4B when a slide-type switch 41*d* is applied, a connection state of each wire may be grasped based on to the position of the switch 41*d*.

Figure 5:
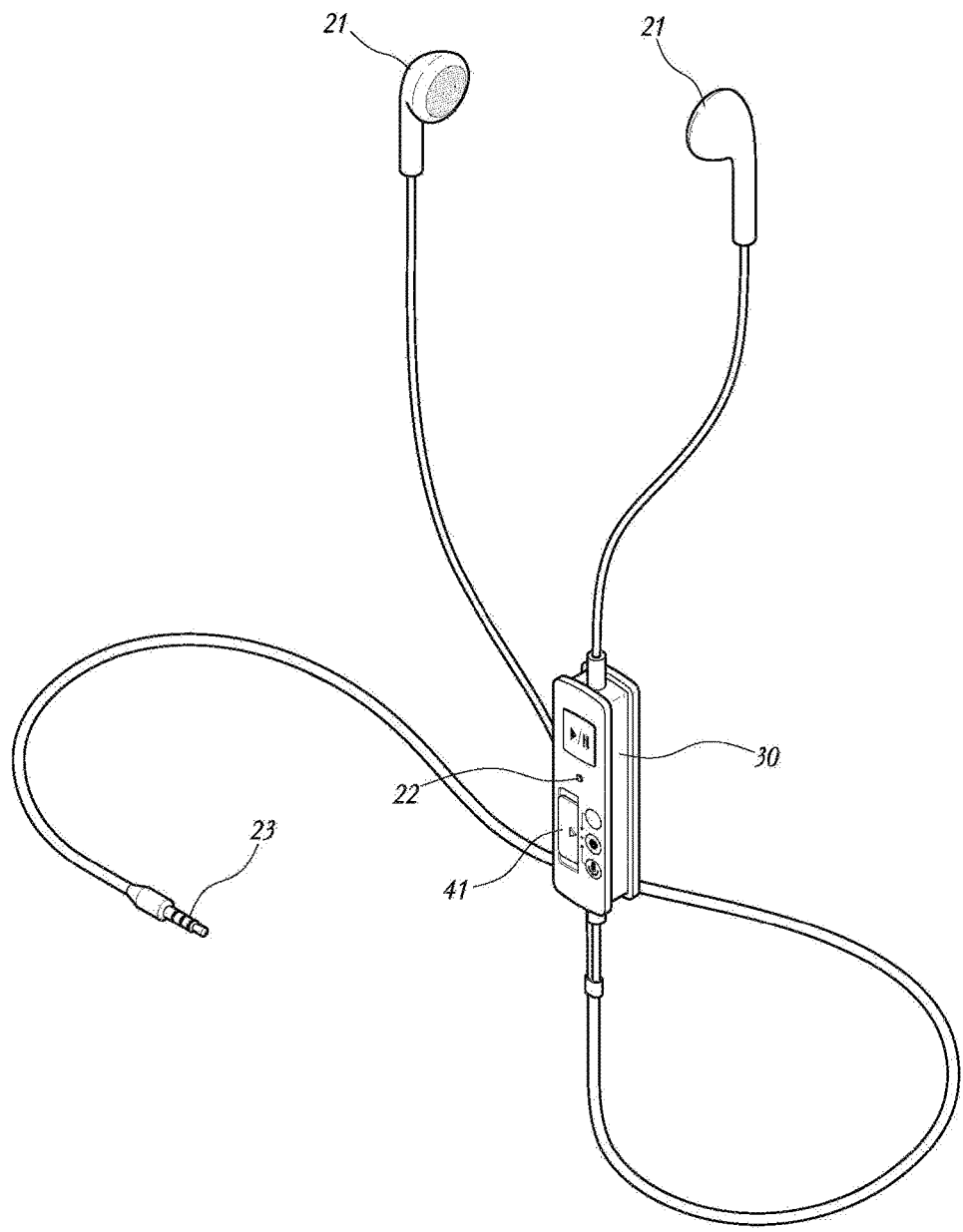
FIG. 5 is an exemplary perspective view showing an exemplary embodiment of the present invention to which a remote controller type handling unit is applied.

Furthermore, FIG. 5 is a view showing an exemplary embodiment of the present invention to which a remote controller type handling unit is applied. As shown in the figure, a user may use the earphone by integrating a remote controller configured to control a portion of the functions of the smart device with the handling unit 30 of the present invention. Through the present invention, a voice signal output from the smart device 10 may be extracted and conveniently input into the smart device 10 via an earphone of a general appearance and structure without a separate device, and loss and distortion may be minimized during extraction and return of the voice signal.

Additionally, since a sound output from the smart device 10 may be freely utilized as an input sound in the process of recording a voice or a video through the smart device 10, user's convenience and utilization of the smart device 10 may be improved. Particularly, since the earphone of the present invention may have a structure, instructions and an appearance the same as those of a general earphone, the earphone may be easily handled and may be configured to return a sound output from the smart device 10, and may allow a user to hear a sound through the ear receiver 21. Further, a voice may be input through the microphone 22. Further, since the functions may be selectively utilized through the switching unit 40, user's convenience may be maximized.

While the present invention has been described with reference to the particular illustrative exemplary embodiments, it is not to be restricted by the embodiments but only by the appended claims. It is to be appreciated that those skilled in the art can change or modify the exemplary embodiments without departing from the scope and spirit of the present invention.

What is claimed is:

1. A voice signal return type earphone for a smart device, having the earphone connected to the smart device comprising:
    an output terminal configured to output a voice signal;
    an input terminal having an ear receiver and a microphone that is configured to input a voice signal;
    a handling unit disposed on a wire that connects the output terminal and the input terminal of the smart device to the ear receiver and the microphone; and a first portion of the wire coupled to the output terminal of the smart device to the ear receiver and a second portion of the wire coupled to the input terminal of the smart device to the microphone are connected to each other within the handling unit through a connection unit that is disposed within the handling unit, wherein the input terminal of the smart device is coupled to the microphone and the connection unit through the wire coupled to a switching unit, and the input terminal of the smart device is configured to be connected or disconnected by the switching unit, and wherein the connection unit is configured to extract the voice signal output from the output terminal and is configured to be transmitted through the wire having the handling unit disposed thereon that couples the microphone and the input terminal to each other to be input into the input terminal.

2. The earphone according to claim 1, wherein an extracted signal control unit is disposed within the connection unit to transform the extracted voice signal.

3. The earphone according to claim 1, wherein a remote controller is configured to control a portion of the functions of the smart device with the handling unit.

4. The earphone according to claim 1, wherein the switching unit further comprises a switch.

5. The earphone according to claim 4, wherein the switch is a slide-type switch.

* * * * *